United States Patent
Hashimoto

(10) Patent No.: US 6,543,285 B2
(45) Date of Patent: Apr. 8, 2003

(54) PHYSICAL QUANTITY DETECTOR APPARATUS

(75) Inventor: Masato Hashimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 18 days.

(21) Appl. No.: 09/778,085

(22) Filed: Feb. 7, 2001

(65) Prior Publication Data

US 2001/0013253 A1 Aug. 16, 2001

(30) Foreign Application Priority Data

Feb. 15, 2000 (JP) ........................................ 2000-037131

(51) Int. Cl.$^7$ .......................... G01P 9/04; G01P 15/125; G01C 19/56
(52) U.S. Cl. ................................ 73/504.14; 73/514.32; 73/862.626
(58) Field of Search .................. 73/514.32, 514.16, 73/514.29, 514.36, 514.18, 514.24, 514.21, 514.23, 514.38, 514.35, 862.626, 504.04, 504.12, 504.14

(56) References Cited

U.S. PATENT DOCUMENTS

| | | | |
|---|---|---|---|
| 6,084,257 A | * | 7/2000 | Petersen et al. ......... 73/514.32 |
| 6,122,964 A | * | 9/2000 | Mohaupt et al. ......... 73/514.32 |
| 6,170,332 B1 | * | 1/2001 | MacDonald et al. ...... 73/514.32 |
| 6,276,207 B1 | * | 8/2001 | Sakai et al. ............. 73/514.32 |
| 6,318,177 B2 | * | 11/2001 | Buchan et al. ........... 73/514.32 |

FOREIGN PATENT DOCUMENTS

| | | |
|---|---|---|
| EP | 1-020-984 A2 | 1/2000 |
| JP | A 7-218268 | 8/1995 |
| JP | 08-159776 | 6/1996 |
| JP | 09-055337 | 2/1997 |
| JP | 10-103960 | 4/1998 |

\* cited by examiner

*Primary Examiner*—Helen Kwok
(74) *Attorney, Agent, or Firm*—Oliff & Berridge, PLC

(57) ABSTRACT

A physical quantity detector apparatus detects a physical quantity in accordance with the displacement of a vibrator. The apparatus includes: a comb-like fixed electrode having a plurality of electrode fingers; and a comb-like movable electrode being displaceable together with the vibrator and having a plurality of electrode fingers. A voltage is applied between the fixed electrode and the movable electrode. A distance D1 from a distal end surface of each electrode finger of the movable electrode to a basal portion of the fixed electrode facing the distal end surface of each electrode finger of the movable electrode, a distance D2 from a distal end surface of each electrode finger of the fixed electrode to a basal portion of the movable electrode facing the distal end surface of each electrode finger of the fixed electrode, a maximum displacement A of the movable electrode in the direction of the axis of each electrode finger, a width w of each electrode finger of the movable electrode and of each electrode finger of the fixed electrode, and a distance d between each electrode finger of the movable electrode and an adjacent electrode finger of the fixed electrode in a direction of the width are set so as to satisfy a relationship of $1/(5dw) > \{1/(D1-A)^2\} + \{1/(D2-A)^2\}$.

18 Claims, 8 Drawing Sheets

FIXED ELECTRODE    MOVABLE ELECTRODE

FIXED ELECTRODE    MOVABLE ELECTRODE

FIXED ELECTRODE    MOVABLE ELECTRODE

FIXED ELECTRODE    MOVABLE ELECTRODE

PHYSICAL QUANTITY DETECTOR APPARATUS

INCORPORATION BY REFERENCE

The disclosure of Japanese Patent Application No. HEI 12-037131 filed on Feb. 15, 2000 including the specification, drawings and abstract is incorporated herein by reference in their entirety.

BACKGROUND OF THE INVENTION

1. Field of the Invention

The present invention relates to a physical quantity detector apparatus which has a vibrator that is displaceably supported on a substrate and which detects a physical quantity, such as angular speed, acceleration, etc., in accordance with the displacement of the vibrator relative to the substrate caused by the force applied to the substrate or the vibrator.

2. Description of the Related Art

Angular speed detector apparatuses as described in Japanese Patent Application Laid-Open No. HEI 10-103960 have been well known. In such an apparatus, a quadrate vibrator is supported onto a substrate so that the vibrator is horizontally displaceable. Using driving electrodes provided on two opposite sides of the quadrate vibrator, the apparatus vibrates the vibrator in the direction of an X-axis that is perpendicular to the two sides of the vibrator. Using detecting electrodes provided on the other two opposite sides of the vibrator, the apparatus detects the angular speed occurring about a vertical axis by detecting vibration of the vibrator in the direction of a Y-axis perpendicular to these two sides. The driving electrodes and the detecting electrodes are respectively made up of a comb-like fixed electrode having a plurality of electrode fingers and a comb-like movable electrode having a plurality of electrode fingers. The electrode fingers of each fixed electrode are fixed to the substrate, and extend from a base portion of the fixed electrode in parallel to one another. The electrode fingers of each movable electrode are provided so as to be displaceable together with the vibrator. The electrode fingers of each movable electrode extend from its base portion in parallel to one another. Voltage is applied between the fixed and movable electrodes. As a result, in the driving electrodes, the electrode fingers of each movable electrode are drawn in a direction of an axis in accordance with the electrostatic attraction that acts between side surfaces of the movable electrode's electrode fingers and side surfaces of the fixed electrode's electrode fingers, so that the movable electrode vibrates in the directions of the axis (i.e., the directions of the length of the electrode fingers) relatively to the fixed electrode. In the detecting electrodes, the electrode fingers of each movable electrode are displaced in accordance with the Coriolis force that is proportional to the angular speed (Coriolis force will be explained below). Based on changes in the capacitance between the movable electrode's electrode fingers and the fixed electrode's electrode fingers, the angular speed is detected.

However, the above-described conventional apparatus has the following drawback with regard to both the driving and detecting electrodes. That is, as distal end surfaces of the movable electrode's electrode fingers approach the base portion of the fixed electrode, which face the distal end surfaces of the movable electrode's electrode fingers, the electrostatic attractions acting between the distal end surfaces of the movable electrode's electrode fingers and the base portion of the fixed electrode and the electrostatic attractions acting between the distal end surfaces of the fixed electrode's electrode fingers and the base portion of the movable electrode increase. These electrostatic attractions are forces that are unnecessary for the driving of the movable electrodes of the driving electrodes and for the detection of displacement of the movable electrodes of the detecting electrodes. As these forces increase, the movable electrodes of the driving and detecting electrodes fail to move with high precision as intended. Thus, the conventional angular speed detector apparatus has a problem of degraded detection precision.

SUMMARY OF THE INVENTION

Accordingly, it is an object of the invention to contrive so that the electrostatic attraction acting between the aforementioned distal end surfaces and the base portion does not greatly affect either the driving of the movable electrode used in driving electrodes or the detection of displacement of the movable electrode used in detecting electrodes. That is, it is an object of the invention to provide a physical quantity detector apparatus wherein the precision in measuring a physical quantity based on the displacement of the movable electrode is improved by allowing the movable electrode to be displaced with good precision due to the aforementioned contrivance.

In order to achieve the foregoing objects, a construction feature of the invention exists in a physical quantity detector apparatus that has a vibrator displaceably supported to a substrate and that detects a physical quantity in accordance with a displacement of the vibrator, the apparatus including: a comb-like fixed electrode fixed to the substrate and having a plurality of electrode fingers that extend from a basal portion of the fixed electrode in parallel to each other; and a comb-like movable electrode being displaceable together with the vibrator and having a plurality of electrode fingers that extend from a basal portion of the movable electrode in parallel to each other and that are inserted between the electrode fingers of the fixed electrode, wherein as a voltage is applied between the fixed electrode and the movable electrode, the movable electrode is displaced in a direction of an axis of each electrode finger (i.e., a direction of the length of each electrode finger). More specifically, the feature is that a distance D1 from a distal end surface of each electrode finger of the movable electrode to the basal portion of the fixed electrode facing the distal end surface of each electrode finger of the movable electrode, a distance D2 from a distal end surface of each electrode finger of the fixed electrode to the basal portion of the movable electrode facing the distal end surface of each electrode finger of the fixed electrode, a maximum displacement A of the movable electrode in the direction of the axis of each electrode finger, a width w of each electrode finger of the movable electrode and of each electrode finger of the fixed electrode, and a distance d between each electrode finger of the movable electrode and an adjacent electrode finger of the fixed electrode in a direction of the width satisfy a relationship of: $1/(5dw) > \{1/(D1-A)^2\} + \{1/(D2-A)^2\}$.

In the physical quantity detector apparatus constructed as described above, the aforementioned relationship:
$1/(5dw) > \{1/(D1-A)^2\} + \{1/(D2-A)^2\}$ is a relationship in which the distances D1, D2, d and the width w are set such that the electrostatic attraction that acts between the distal end surfaces of the electrode fingers of the movable electrode and of the electrode fingers of the fixed electrode and the basal portions of the fixed and movable electrodes facing the distal end surfaces has no great effect on the driving of the movable electrode in a case where the fixed and movable electrodes are used as driving electrodes, and has no great effect on the displacement of the movable electrode in a case where the fixed and movable electrodes are used as detecting electrodes. Therefore, the movable electrode can be displaced with good precision. Hence, the precision in measuring a physical quantity by utilizing the displacement of the movable electrode can be improved.

BRIEF DESCRIPTION OF THE DRAWINGS

The above and other objects, features, advantages, and technical and industrial significance of this invention will be better understood by reading the following detailed description of presently preferred embodiments of the invention, when considered in connection with the accompanying drawing, in which.

DETAILED DESCRIPTION OF PREFERRED EMBODIMENTS

In the following description and the accompanying drawings, the present invention will be described in detail in terms of specific embodiments.

Figure 1:
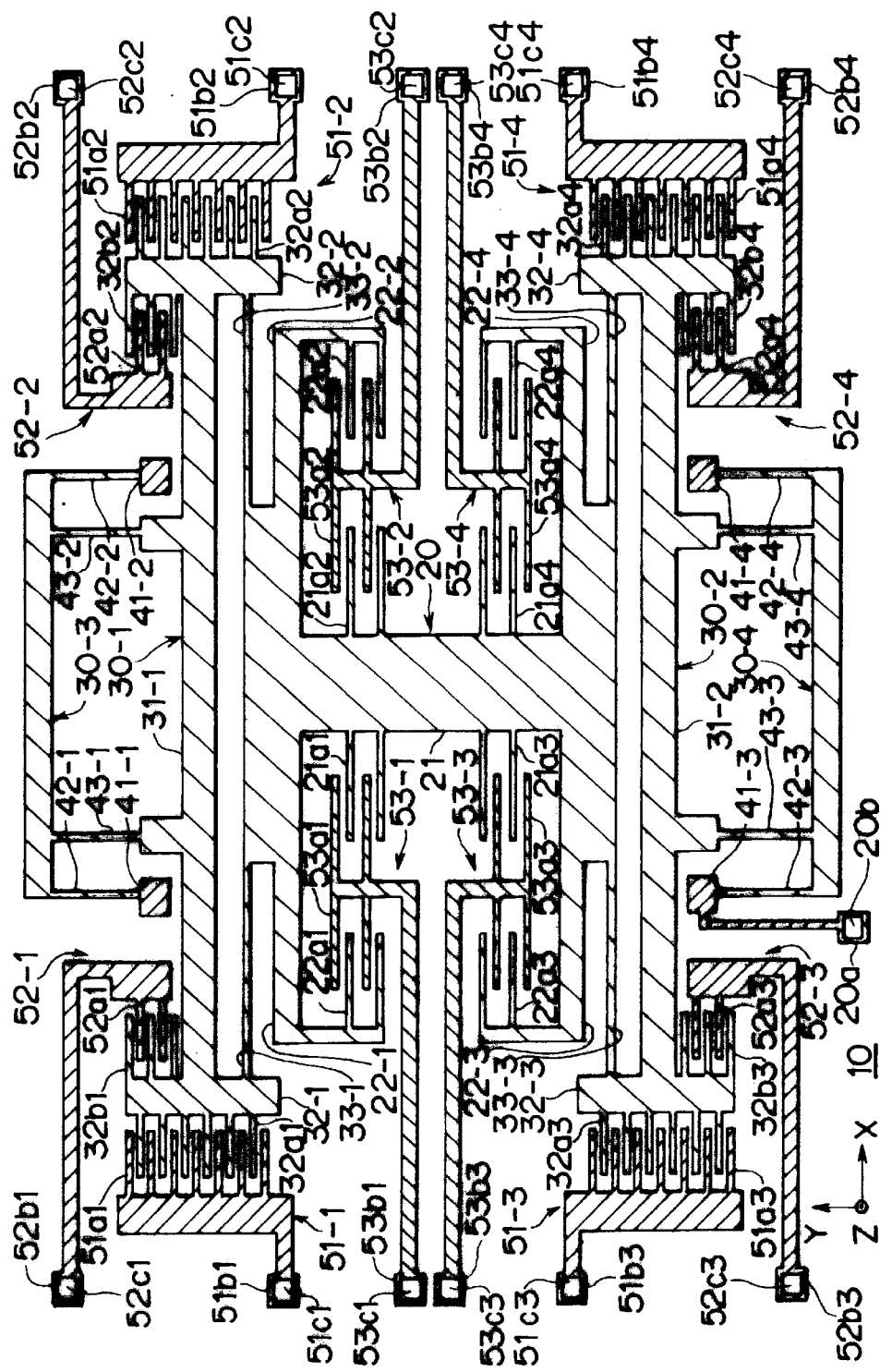
FIG. 1 is a plan view of an angular speed detecting device according to an embodiment of the invention.

An embodiment in which the physical quantity detector apparatus of the invention is applied to an angular speed detector apparatus will be described. Description will first be made with reference to FIG. 1. FIG. 1 is a plan view of an angular speed detecting device employed in the angular speed detector apparatus. In FIG. 1, members spaced from a substrate 10 and members not spaced from the substrate 10 are indicated by different shading patterns. The members spaced from and not spaced from the substrate 10 are differentiated by diagonal shading having a different spacing between the diagonal shading lines. Elements spaced from the substrate 10 are indicated by the diagonal shading lines having the larger spacing while members fixed to and not spaced from the substrate 10 are indicated by diagonal shading lines a smaller spacing.

This angular speed detecting device is formed symmetrically about centerlines in the directions of X and Y-axes that interest perpendicularly to each other on a horizontal plane. The substrate 10 is formed from silicon into a quadrate shape. A vibrator 20, a pair of main frames 30-1, 30-2, and a pair of subsidiary frames 30-3, 30-4 extend in a horizontal plane that is spaced a predetermined distance from an upper surface of the substrate 10.

The vibrator 20, while vibrating in the directions of the X-axis, vibrates in the directions of the Y-axis due to the angular speed occurring about a Z-axis perpendicular to the X and Y-axes, with an amplitude proportional to the magnitude of the angular speed. The mass portion 21 has a generally "H" shape. That is, the vibrator 20 has a generally quadrate mass portion 21 which has an appropriate mass and which is provided in a central portion of the vibrator 20 in such a manner that the sides of the mass portion 21 extend in the directions of the X-axis or the Y-axis, and four arm portions 22-1 to 22-4 which extend from corresponding vertex sites of the mass portion 21 in the directions of the X-axis.

The main frames 30-1 and 30-2 vibrate the vibrator 20 in the directions of the X-axis. Each of the main frames 30-1, 30-2 has a generally "I" shape. That is, each main frame has a wide elongated portion 31-1 or 31-2 that extends in the directions of the X-axis, at a position that is outward of the adjacent arm portions 22-1, 22-2 or 22-3, 22-4 of the vibrator 20 with respect to the directions of the Y-axis, and wide and short terminal portions 32-1, 32-2 or 32-3, 32-4 that extend from opposite ends of the elongated portion 31-1 or 31-2 toward opposite sides the elongated portion in the directions of the Y-axis. The subsidiary frames 30-3, 30-4 also have an increased width, and extend in the directions of the X-axis, at positions outward of the elongated portions 31-1, 31-2 with respect to the directions of the Y-axis.

The main frames 30-1 and 30-2 are connected to the vibrator 20 via beams 33-1 to 33-4. The beams 33-1 to 33-4 also extend in the directions of the X-axis in a horizontal plane spaced a predetermined distance from the upper surface of the substrate 10. Each of the beams 33-1 to 33-4 is connected at one end thereof to a near basal portion of a corresponding one of the arm portions 22-1 to 22-4 of the vibrator 20. Another end of each beam is connected to a corresponding one of the terminal portions 32-1 to 32-4 of the main frames 30-1, 30-2. The beams 33-1 to 33-4 are narrower than the arm portions 22-1 to 22-4 of the vibrator 20, and than the elongated portions 31-1, 31-2 and the terminal portions 32-1 to 32-4 of the main frames 30-1, 30-2. Therefore, vibrations in the directions of the Y-axis are not easily conveyed from the main frames 30-1, 30-2 to the vibrator 20 whereas vibrations in the directions of the x-axis are efficiently conveyed from the main frames 30-1, 30-2 to the vibrator 20. Furthermore, the vibrator 20 vibrates more easily in the directions of the Y-axis than in the directions of the X-axis, with respect to the main frames 30-1, 30-2.

The main frame 30-1 is supported for vibrating movements to the substrate 10 via anchors 41-1, 41-2, beams 42-1, 42-2, the subsidiary frame 30-3, and beams 43-1, 43-2.

The anchors 41-1 and 41-2 are fixed to the upper surface of the substrate 10, at positions outward of the elongated portion 31-1 of the main frame 30-1 with respect to the directions of the Y-axis. Each of the beams 42-1, 42-2 is connected at one end thereof to a corresponding one of the anchors 41-1, 41-2, and extends from the anchor 41-1, 41-2 outward in the directions of the Y-axis. A distal end of each beam 42-1, 42-2 is connected to an inward end of the subsidiary frame 30-3. Each of the beams 43-1, 43-2, extending inward of the subsidiary frame 30-3 with respect to the directions of the Y-axis, is connected at one end thereof to the subsidiary frame 30-3. Another end of each beam 43-1, 43-2 is connected to an outward end of the elongated portion 31-1 of the main frame 30-1 that faces outward in the directions of the Y-axis. The beams 42-1, 42-2, 43-1 and 43-2 are spaced a predetermined distance from the substrate 10 as in the case of the vibrator 20, the main frame 30-1 and the subsidiary frame 30-3, and have a reduced width as in the case of the beams 33-1, 33-2.

The main frame 30-2 is supported for vibrations to the substrate 10 via anchors 41-3, 41-4, beams 42-3, 42-4, the subsidiary frame 30-4 and beams 43-3, 43-4. The anchors 41-3, 41-4, the beams 42-3, 42-4, the subsidiary frame 30-4 and the beams 43-3, 43-4 are formed symmetrically about the centerline in the directions of the Y-axis to and substantially in the same manner as the anchors 41-1, 41-2, the beams 42-1, 42-2, the subsidiary frame 30-3 and the beams 43-1, 43-2, respectively. With these arrangements, the main frames 30-1 and 30-2 are supported so that the main frames easily vibrate in the directions of the X-axis and do not easily vibrate relatively to the substrate 10 in the directions of the Y-axis.

Provided on the substrate 10 are driving electrodes 51-1 to 51-4 for driving the main frames 30-1, 30-2 relatively to the substrate 10 in the directions of the X-axis, and drive monitor electrodes 52-1 to 52-4 for monitoring the driving of the main frames 30-1, 30-2 relative to the substrate 10 in the directions of the X-axis, and detecting electrodes 53-1 to 53-4 for detecting the vibration of the vibrator 20 relative to the substrate 10 in the directions of the Y-axis.

Each of the driving electrodes 51-1 to 51-4 has, at a position outward of a corresponding one of the terminal portions 32-1 to 32-4 of the main frames 30-1, 30-2 with respect to the directions of the X-axis, a comb-like electrode 51a1 to 51a4 that has a plurality of electrode fingers that extend toward the corresponding one of the terminal portions 32-1 to 32-4 in the direction of the X-axis. Each comb-like electrode 51a1 to 51a4 is formed together with a pad 51b1 to 51b4 connected to the comb-like electrode 51a1 to 51a4, and is fixed to the upper surface of the substrate 10. Each pad 51b1 to 51b4 has, on its upper surface, an electrode pad 51c1 to 51c4 that is formed from an electrically conductive metal (e.g., aluminum). The terminal portions 32-1 to 32-4 are provided with comb-like electrodes 32a1 to 32a4 each having a plurality of electrode fingers that extend outward in the directions of the X-axis. The comb-like electrodes 32a1 to 32a4 face the comb-like electrodes 51a1 to 51a4, respectively. The comb-like electrodes 32a1 to 32a4 are formed together with the terminal portions 32-1 to 32-4, respectively, and are spaced a predetermined distance from the upper surface of the substrate 10. Each electrode finger of each of the comb-like electrodes 32a1 to 32a4 is inserted to a widthwise central position between adjacent electrode fingers of the corresponding one of the comb-like electrodes 51a1 to 51a4, and faces those adjacent electrode fingers.

Each of the drive monitor electrodes 52-1 to 52-4 has, at a position inward of a corresponding one of the terminal portions 32-1 to 32-4 of the main frames 30-1, 30-2 with respect to the directions of the X-axis, a comb-like electrode 52a1 to 52a4 having a plurality of electrode fingers that extend toward the corresponding one of the terminal portions 32-1 to 32-4 in the direction of the X-axis. Each comb-like electrode 52a1 to 52a4 is formed together with a pad 52b1 to 52b4 connected to the comb-like electrode 52a1 to 52a4, and is fixed to the upper surface of the substrate 10. Each pad 52b1 to 52b4 has, on its upper surface, an electrode pad 52c1 to 52c4 that is formed from an electrically conductive metal (e.g., aluminum). The terminal portions 32-1 to 32-4 are provided with comb-like electrodes 32b1 to 32b4 each having a plurality of electrode fingers that extend inward in the directions of the X-axis. The comb-like electrodes 32b1 to 32b4 face the comb-like electrodes 52a1 to 52a4, respectively. The comb-like electrodes 32b1 to 32b4 are formed together with the terminal portions 32-1 to 32-4, respectively, and are spaced a predetermined distance from the upper surface of the substrate 10. Each electrode finger of each of the comb-like electrodes 32b1 to 32b4 is inserted to a widthwise central position between adjacent electrode fingers of the corresponding one of the comb-like electrodes 52a1 to 52a4, and faces those adjacent electrode fingers.

Each of the detecting electrodes 53-1 to 53-4 has, at a position outward of the mass portion 21, a comb-like electrode 53a1 to 53a4 that has a plurality of electrode fingers that extend inward and outward in the directions of the X-axis. Each comb-like electrode 53a1 to 53a4 is formed together with a pad 53b1 to 53b4 connected to the comb-like electrode 53a1 to 53a4, and is fixed to the upper surface of the substrate 10. Each pad 53b1 to 53b4 has, on its upper surface, an electrode pad 53c1 to 53c4 that is formed from an electrically conductive metal (e.g., aluminum). The mass portion 21 of the vibrator 20 has comb-like electrodes 21a1 to 21a4 each of which has a plurality of electrode fingers that extend outward in the directions of the X-axis. The comb-like electrodes 21a1 to 21a4 face corresponding half portions of the comb-like electrodes 53a1 to 53a4. A distal end portion of each of the arm portions 22-1 to 22-4 of the vibrator 20 also has a comb-like electrode 22a1 to 22a4 that has a plurality of electrode fingers that extend inward in the directions of the X-axis. The comb-like electrodes 22a1 to 22a4 face corresponding half portions of the comb-like electrodes 53a1 to 53a4. The comb-like electrodes 21a1 to 21a4 and 22a1 to 22a4 are formed together with the mass portion 21 and the arm portions 22-1 to 22-4, respectively, and are spaced a predetermined distance from the upper surface of the substrate 10. The electrode fingers of each of the comb-like electrodes 21a1 to 21a4 and 22a1 to 22a4 are inserted between adjacent electrode fingers of the corresponding one of the comb-like electrodes 53a1 to 53a4. The electrode fingers of each of the comb-like electrodes 21a1 to 21a4 and 22a1 to 22a4 are offset toward one side from widthwise central positions between adjacent electrode fingers of the corresponding one of the comb-like electrodes 53a1 to 53a4.

The substrate 10 is further provided with beams 33-3, 33-4 for the vibrator 20, the main frame 30-2, beams 43-3, 43-4, the subsidiary frame 30-4, and beams 42-3, 42-4. The beam 42-3 is provided with a pad 20a that is electrically connected to the beam 42-3 via an anchor 41-3. Another anchor 41-4 is provided at a distal end of the beam 42-4. The pad 20a is formed together with the anchor 41-3, and is fixed to the upper surface of the substrate 10. The pad 20a has, on its upper surface, an electrode pad 20b that is formed from an electrically conductive metal (e.g., aluminum).

Figure 2:
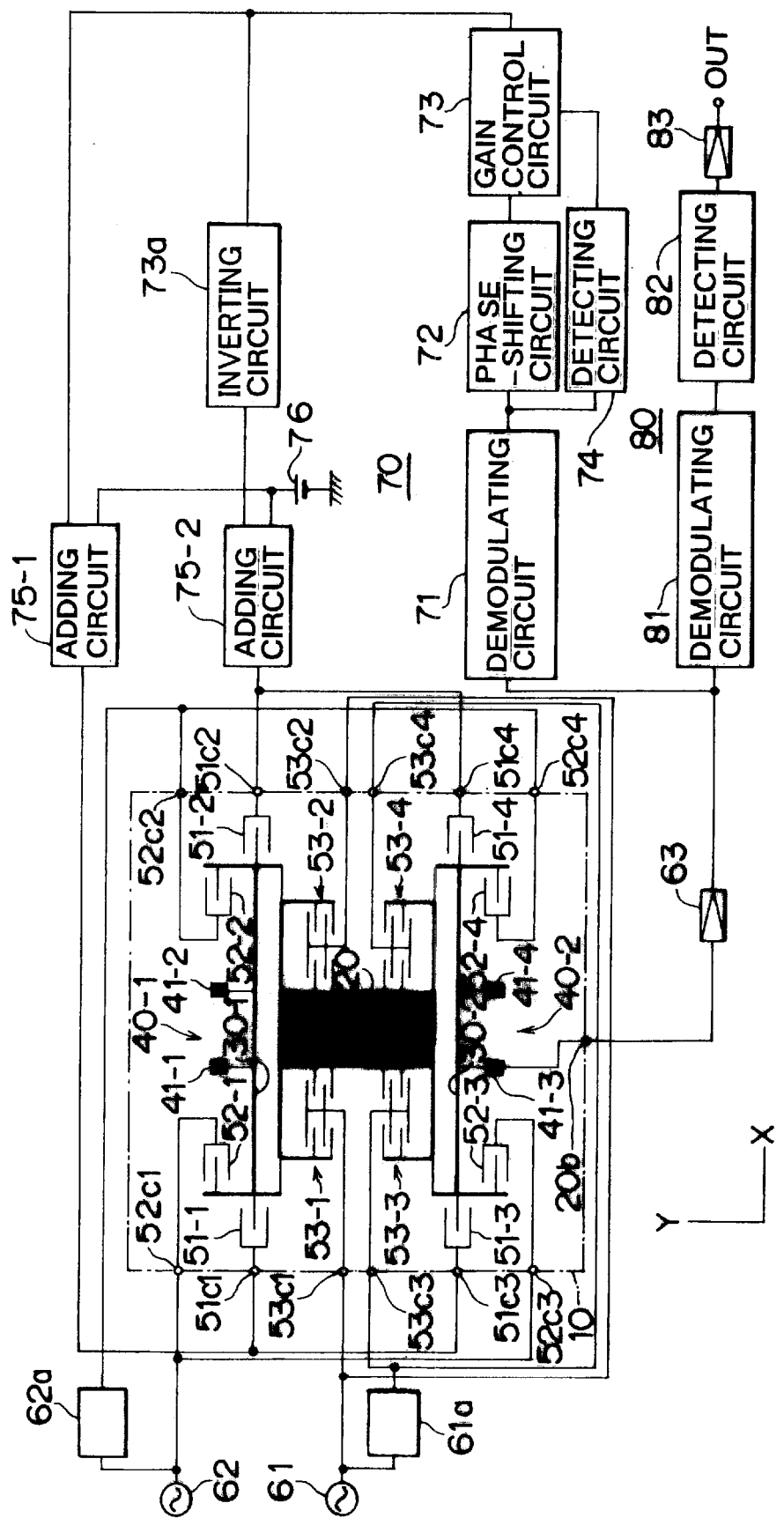
FIG. 2 is an overall block diagram of an angular speed detector apparatus, wherein an electric circuit apparatus is connected to the angular speed detecting device.

Next, an electric circuit apparatus for detecting the angular speed by using the angular speed detecting device constructed as described above will be described. FIG. 2 illustrates the electric circuit apparatus in a block diagram.

A high-frequency oscillator 61 is connected to the electrode pads 53c1, 53c2 of the detecting electrodes 53-1, 53-2. The oscillator 61 supplies the pads 53c1, 53c2 with a detecting signal $E_1 \sin(2\pi f_1 t)$ of a frequency $f_1$ that is much higher than the resonance frequency of the vibrator 20. A phase inverting circuit 61a is connected to the high-frequency oscillator 61. The circuit 61a supplies the electrode pads 53c3, 53c4 of the detecting electrodes 53-3, 53-4 with a detecting signal $E_1 \sin(2\pi f_1 t+\pi)$ obtained by inverting the phase of the detecting signal $E_1 \sin(2\pi f_1 t)$.

A high-frequency oscillator 62 is connected to the electrode pads 52c1, 52c3 of the drive monitor electrodes 52-1, 52-3. The oscillator 62 supplies the electrode pads 52c1, 52c3 with a monitoring signal $E_2 \sin(2\pi f_2 t)$ of a frequency $f_2$ that is much higher than the resonance frequency of the vibrator 20 and that is different from the frequency $f_1$. A phase inverting circuit 62a is connected to the high-frequency oscillator 62. The phase inverting circuit 62a supplies the electrode pads 52c2, 52c4 of the drive monitor electrodes 52-2, 52-4 with a monitoring signal $E_2 \sin(2\pi f_2 t+\pi)$ obtained by inverting the phase of the monitoring signal $E_2 \sin(2\pi f_2 t)$. Therefore, if the vibrations of the vibrator 20 in the directions of the X and Y-axes are represented by $E_{0x} \sin(2\pi f_0 t)$ and $E_{0y} \sin(2\pi f_0 t)$, the signals that are outputted from the electrode pad 20b and indicate the vibrations in the directions of the X-axis and the Y-axis can be expressed as $E_2 E_{0x} \sin(2\pi f_0 t) \sin(2\pi f_2 t)$ and $E_1 E_{0y} \sin(2\pi f_0 t)\sin(2\pi f_1 t)$, where $f_0$ is a frequency close to the resonance frequency of the vibrator 20.

A drive circuit 70 is connected to the electrode pads 51c1 to 51c4 of the driving electrodes 51-1 to 51-4. The drive circuit 70 generates a drive signal based on a signal inputted from the electrode pad 20b via an amplifier 63, and supplies the generated signal to the electrode pads 51c1 to 51c4.

The drive circuit 70 has a demodulating circuit 71, a phase-shifting circuit 72, and a gain control circuit 73 that are connected to the amplifier 63 in series. The drive circuit 70 further has a detecting circuit 74 that is connected to the demodulating circuit 71 and that controls the gain of the gain control circuit 73. The demodulating circuit 71 performs synchronous detection of the signal from the electrode pad 20b at the frequency $f_2$ (i.e., extracts the envelope of amplitude of the signal of a frequency $2\pi f_2$), and outputs a signal $E_{0x} \sin(2\pi f_0 t)$ indicating the component of vibration of the vibrator 20 in the directions of the X-axis. The phase-shifting circuit 72 advances the phase of an input signal by $\pi/2$ for the purpose of correction for a delay of $\pi/2$ (corresponding to $\frac{1}{8}\pi f_0$ second) of a detection signal indicating the vibration of the vibrator 20 from the signal for driving the vibrator 20, and outputs the phase-advanced signal. The detecting circuit 74 performs synchronous detection of the signal from the demodulating circuit 71 at the frequency $f_0$ (i.e., extracts the envelope of amplitude of the component of vibration of the vibrator 20 in the directions of the X-axis), and outputs a signal $E_{0x}$ indicating the amplitude of the component of vibration of the vibrator 20 in the directions of the X-axis. The gain control circuit 73 controls the gain of the output signal from the phase-shifting circuit 72 in accordance with the signal $E_{0x}$ from the detecting circuit 74 so that the amplitude of the input signals of the phase-shifting circuit 72 and the gain control circuit 73 (the amplitude of the component of vibration of the vibrator 20 in the directions of the X-axis) becomes constant, and then outputs the gain-controlled signal. That is, the gain control circuit 73 controls the signal so that the amplitude of the output signal of the gain control circuit 73 decreases as the signal from the detecting circuit 74 increases, and outputs the controlled signal.

The drive circuit 70 is further provided with an adding circuit 75-1 connected to an output of the gain control circuit 73, and an adding circuit 75-2 connected to the gain control circuit 73 via a phase inverting circuit 73a. The phase inverting circuit 73a inverts the phase of the signal from the gain control circuit 73, and outputs the phase-inverted signal. The adding circuits 75-1, 75-2 are connected to a direct-current power supply 76 that outputs a direct-current voltage $E_B$.

The adding circuit 75-1 adds the signal $E_{0x}' \sin(2\pi f_0 t)$ to the direct-current voltage signal $E_B$ from the direct-current power supply 76, and supplies the added voltage $E_B+E_{0x}' \sin(2\pi f_0 t)$ to the electrode pads 51c1, 51c3 of the driving electrodes 51-1, 51-3. The adding circuit 75-2 adds the signal $E_{0x}' \sin(2\pi f_0 t+\pi)$ from the phase inverting circuit 73a to the direct-current voltage signal $E_B$ from the direct-current power supply 76, and supplies the added voltage $E_B+E_{0x}' \sin(2\pi f_0 t+\pi)$ to the electrode pads 51c2, 51c4 of the driving electrodes 51-2, 51-4.

An output circuit 80 formed by a demodulating circuit 81, a detecting circuit 82 and an amplifier 83 that are connected in series is connected to the amplifier 63. The demodulating circuit 81 performs synchronous detection of the signal from the electrode pad 20b at the frequency $f_0$ (i.e., extracts the envelope of amplitude of the signal of the frequency $f_1$), and outputs a signal $E_{0y} \sin(2\pi f_0 t)$ indicating the component of vibration of the vibrator 20 in the directions of the Y-axis. The detecting circuit 82 performs synchronous detection of the signal from the demodulating circuit 81 at the frequency $f_0$ (i.e., extracts the envelope of amplitude of the component of vibration of the vibrator 20 in the directions of the Y-axis), and outputs a signal $E_{0y}$ indicating the amplitude of the component of vibration of the vibrator 20 in the directions of the Y-axis. The amplifier 83 inputs the signal $E_{0y}$, and outputs from an output terminal OUT a direct-current signal indicating the magnitude of vibration of the vibrator 20 in the directions of the Y-axis.

Operation of the angular speed detector apparatus constructed as described above will be described. The drive voltage signal $E_B+E_{0x}' \sin(2\pi f_0 t)$ is applied to each of the driving electrodes 51-1, 51-3, and the drive voltage signal $E_B+E_{0x}' \sin(2\pi f_0 t+\pi)=E_B-E_{0x}' \sin(2\pi f_0 t)$ is applied to each of the driving electrodes 51-2, 51-4. Therefore, equal forces act on the main frames 30-1, 30-2 in the directions of the X-axis due to electrostatic attraction, so that the main frames 30-1, 30-2 synchronize at a vibration frequency $f_0$ in the directions of the X-axis, and vibrate with equal amplitudes. The vibration of the main frames 30-1, 30-2 is conveyed to the vibrator 20 via the beams 33-1 to 33-4, so that the vibrator 20 also vibrates at the vibration frequency $f_0$ in the directions of the X-axis.

In this case, due to the operation of the oscillator 62, the phase inverting circuit 62a and the drive monitor electrodes 52-1 to 52-4, a signal $E_2 E_{0x} \sin(2\pi f_0 t)\sin(2\pi f_2 t)$ indicating the component of vibration in the directions of the X-axis is supplied to the drive circuit 70 via the electrode pad 20b and the amplifier 63. The demodulating circuit 71, the detecting circuit 74, the phase-shifting circuit 72 and the gain control circuit 73 forming the drive circuit 70 operate so that the input signal $E_{0x} \sin(2\pi f_0 t)$ of the phase-shifting circuit 72 and the gain control circuit 73, that is, the component of vibration in the directions of the X-axis supplied from the electrode pad 20b, is always constant in terms of time. Therefore, the vibrator 20 always vibrates in the directions of the X-axis with a constant amplitude.

If an angular speed occurs about the Z-axis while the above-described state is maintained, the vibrator 20 starts to vibrate in the directions of the Y-axis with an amplitude proportional to the angular speed due to Coriolis force. Coriolis force will be briefly described. If a rectangular coordinate system rotating at an angular speed ω is assumed relative to a rest rectangular coordinate system, motion can be described in a view from the rotating coordinate system, taking into consideration the force that acts in the inertia system as well, and two other forces, that is, centrifugal force and another force. The latter force is Coriolis force. In this case, due to the vibration of the vibrator 20 in the directions of the Y-axis, the capacitance of the detecting electrodes 53-1 to 53-4 changes in accordance with the vibration. The change in capacitance appears in the electrode pad 20b as a signal modulated in amplitude from the detecting signals $E_1 \sin(2\pi f_1 t)$ and $E_1 \sin(2\pi f_1 t+\pi)=-E_1 \sin(2\pi f_1 t)$ outputted from the oscillator 61 and the phase inverting circuit 61a, that is, as a signal $E_1 E_{0y} \sin(2\pi f_0 t)\sin(2\pi f_1 t)$. The signal is then outputted to the output circuit 80 via the amplifier 63. The output circuit 80 outputs from the output terminal OUT the signal $E_{0y}$ indicating the magnitude of the vibration of the vibrator 20 in the directions of the Y-axis, due to the operation of the demodulating circuit 81, the detecting circuit 82 and the amplifier 83. Since the magnitude of the vibration in the directions of the Y-axis is proportional to the angular speed about the Z-axis, the signal outputted from the output terminal OUT is a detection signal indicating the angular speed.

Figure 3:
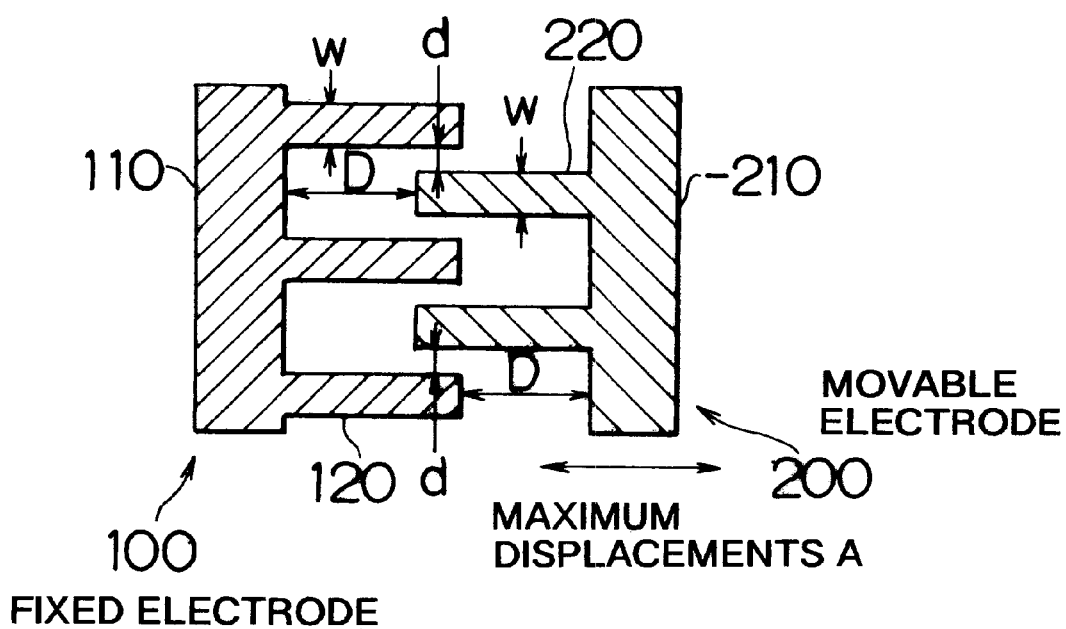
FIG. 3 is an enlarged fragmental plan view of an electrode portion applied to a detecting electrode portion and a drive monitor electrode portion and related to a feature of the invention.

Next, the comb-like electrodes which are used in the angular speed detecting device that operates as described above and which are a feature of the invention and form movable electrodes and fixed electrodes will be described in detail. The comb-like electrodes correspond to the driving electrodes 51-1 to 51-4 and the drive monitor electrodes 52-1 to 52-4 in the above-described embodiment. FIG. 3 illustrates portions of comb-like electrodes in an enlarged view. In FIG. 3, a comb-like electrode fixed to the substrate 10 is shown as a fixed electrode 100, and a comb-like electrode that is spaced a predetermined distance upward from the substrate 10 and that is displaceable relatively to the substrate 10 is shown as a movable electrode 200.

The fixed electrode 100 has a basal portion 110 that extends with a relatively great width, and a plurality of electrode fingers 120 that extend from the basal portion 110 in a perpendicular direction and in parallel to one another. The basal portion 110 and the electrode fingers 120 are fixed to the substrate 10. The movable electrode 200 has a basal portion 210 (formed together with the main frame 30-1, 30-2) that extends with a relatively great width, and a plurality of electrode fingers 220 that extend from the basal portion 210 in a perpendicular direction and in parallel to one another. The electrode fingers 220 are inserted to central positions between the electrode fingers 120 of the fixed electrode 100. The basal portion 210 and the electrode fingers 220 are displaceable relatively to the substrate 10 (displaceable together with the vibrator 20 and the main frames 30-1, 30-2). The electrode fingers 120 of the fixed electrode 100 and the electrode fingers 220 of the movable electrode 200 are elongated, and have equal widths and equal lengths, and extend in the directions of the axis.

In this case, as indicated in FIG. 3, the distance from a distal end surface of each electrode finger 220 of the movable electrode 200 to an edge of the basal portion 110 of the fixed electrode 100 that faces the distal end surface of the electrode finger 220 and that is located between electrode fingers 120 of the fixed electrode 100, and the distance from a distal end surface of each electrode finger 120 of the fixed electrode 100 to an edge of the basal portion 210 of the movable electrode 200 that faces the distal end surface of the electrode finger 120 and that is located between electrode fingers 220 of the movable electrode 200 are both defined as "D". The maximum displacement of the movable electrode 200 in the direction of the axis of each electrode finger 220 is defined as "A". The distances from each electrode finger 220 of the movable electrode 200 to two adjacent electrode fingers 120 of the fixed electrode 100 in the directions of the width of the electrode fingers are both defined as "d". The width of the electrode fingers 120, 220 of the fixed electrode 100 and the movable electrode 200 is defined as "w".

Figure 4A:
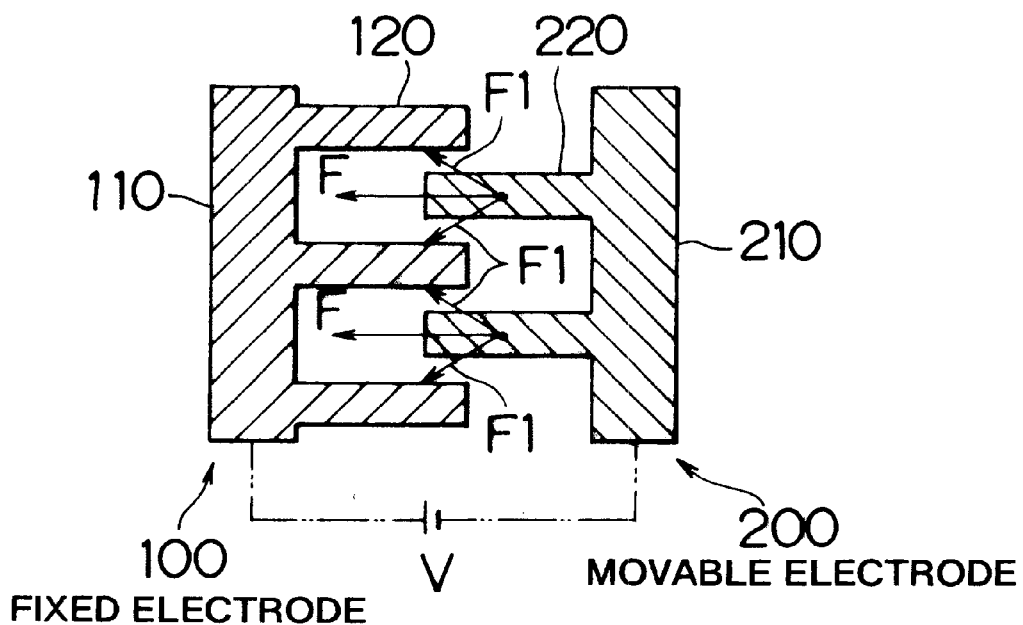
FIG. 4A is a plan view of the electrode portion, illustrating a state in which a movable electrode shown in FIG. 3 is at a reference position.
Figure 4B:
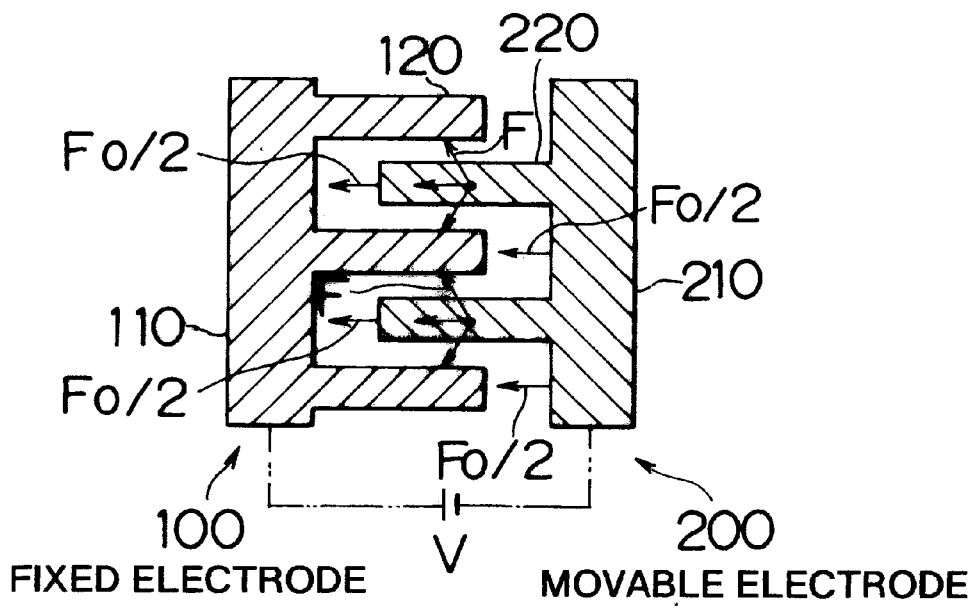
FIG. 4B is a plan view of the electrode portion, illustrating a state in which the movable electrode has been maximally displaced toward a fixed electrode.

As indicated in FIGS. 4A and 4B, if a voltage V is applied between the fixed electrode 100 and the movable electrode 200 arranged as described above (corresponding to application of a voltage from the adding circuits 75-1, 75-2 between the electrode pads 51c1 and 51c2 and between the electrode pads 51c3 and 51c4 of the angular speed detecting device), electrostatic attractions F1, F1 act between opposite side surfaces of the electrode fingers 120 of the fixed electrode 100 and opposite side surfaces of the electrode fingers 220 of the movable electrode 200, so that the electrode finger 220 is pulled and displaced toward the basal portion 110 of the fixed electrode 100 by a driving force F (resultant force of F1 and F1) in the direction of the axis. The driving force F is expressed as in mathematical expression 1, in which T is the thickness of the electrode fingers 220, and ε is the permittivity.

$$F=\epsilon TV^2/d \qquad \text{[Mathematical Expression 1]}$$

An electrostatic attraction $F_0$ obtained by summing an electrostatic attraction $F_0/2$ that acts between the distal end surfaces of the electrode fingers 220 of the movable electrode 200 and the basal portion 110 of the fixed electrode 100 facing the distal end surfaces of the electrode fingers 220 and an electrostatic attraction $F_0/2$ that acts between the distal end surfaces of the electrode fingers 120 of the fixed electrode 100 and the basal portion 210 of the movable electrode 200 facing the distal end surfaces of the electrode fingers 120 becomes a problem when the electrode fingers 220 of the movable electrode 200 penetrate deep into the spaces between the electrode fingers 120 of the fixed electrode 100, whereas the electrostatic attraction $F_0$ is ignorable while such penetration is not deep. Given an amount of displacement A from the reference position that occurs at the time of maximum penetration of the electrode fingers 220 between the electrode fingers 120, the electrostatic attraction $F_0$ can be expressed as in mathematical expression 2.

$$F_0=\epsilon TwV^2/(D-A)^2 \qquad \text{[Mathematical Expression 2]}$$

The electrostatic attraction $F_0$ is a force that is not needed to drive the movable electrode 200 when the electrodes are used as driving electrodes (corresponding to the driving electrodes 51-1 to 51-4 of the angular speed detecting device). Increases of this electrostatic attraction impede the driving and displacing of the movable electrode 200 with a high precision as intended. The present inventor have empirically confirmed that the electrostatic attraction $F_0$ is ignorable if mathematical expressions 1 and 2 satisfy a relationship of $F>10F_0$. By substituting mathematical expressions 1, 2 in the relationship of $F>10F_0$, a relationship of mathematical expression 3 is obtained.

$$D > A + (10dw)^{1/2} \quad \text{[Mathematical Expression 3]}$$

Figure 5:
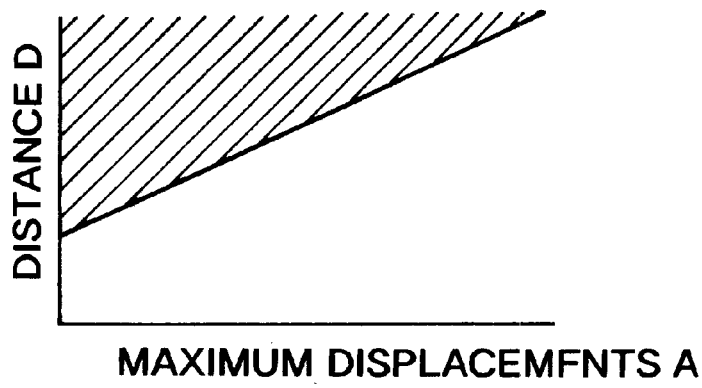
FIG. 5 is a graph indicating a relationship between the maximum amount of displacement A and the distance D indicated in FIG. 3.

Therefore, if the fixed electrode 100 and the movable electrode 200 are designed so that the distances D and d, the maximum amount of displacement A and the width w satisfy the relationship of $D>A+(10dw)^{1/2}$ (an area indicated by hatching in FIG. 5), the movable electrode 200 can be displaced with good precision, and the precision in measuring a physical quantity based on displacement of the movable electrode 200 (e.g., angular speed in the case of the angular speed detecting device) can be enhanced. That is, as the distance D is increased, and as the distance d and the width w are reduced, the effect of the electrostatic attraction $F_0$ decreases, so that the precision in measuring the physical quantity can be improved.

In designing the distances D, d, the maximum amount of displacement A, and the width w regarding the fixed electrode 100 and the movable electrode 200, it is advisable to first specify the distance d and the width w, considering the limits in processing the electrodes 100, 200. Subsequently, the maximum amount of displacement A, which affects the sensitivity of the electrodes 100, 200, may be determined. In this case, it is preferable that the maximum amount of displacement A be great in order to increase the degree of freedom of the drive voltage. However, if the maximum amount of displacement A is excessively great, it becomes necessary to increase the distance D, which leads to a size increase of the fixed electrode 100 and the movable electrode 200. Therefore, it is advisable that the maximum amount of displacement A be determined while the sensitivity and the size of the fixed electrode 100 and the movable electrode 200 are taken into consideration, and that the distance D be finally determined.

The relationship among the distances D, d, the maximum amount of displacement A and the width w is substantially the same for detecting electrodes that correspond to the drive monitor electrodes 52-1 to 52-4 of the angular speed detecting device. That is, in the case of detecting electrodes, too, the effect of the attraction force $F_0$ on the displacement of the movable electrode 200 leads to deterioration of the precision in detecting the displacement of the movable electrode 200. Therefore, in this case, too, if the fixed electrode 100 and the movable electrode 200 are designed so that the distances D, d, the maximum amount of displacement A and the width w satisfy the relationship of $D>A+(10dw)^{1/2}$ (the area indicated by hatching in FIG. 5), it becomes possible to detect the displacement of the movable electrode 200 with good precision, and to enhance the precision in measuring the physical quantity (the angular speed in the case of the angular speed detecting device) based on the displacement of the movable electrode 200.

Figure 6:
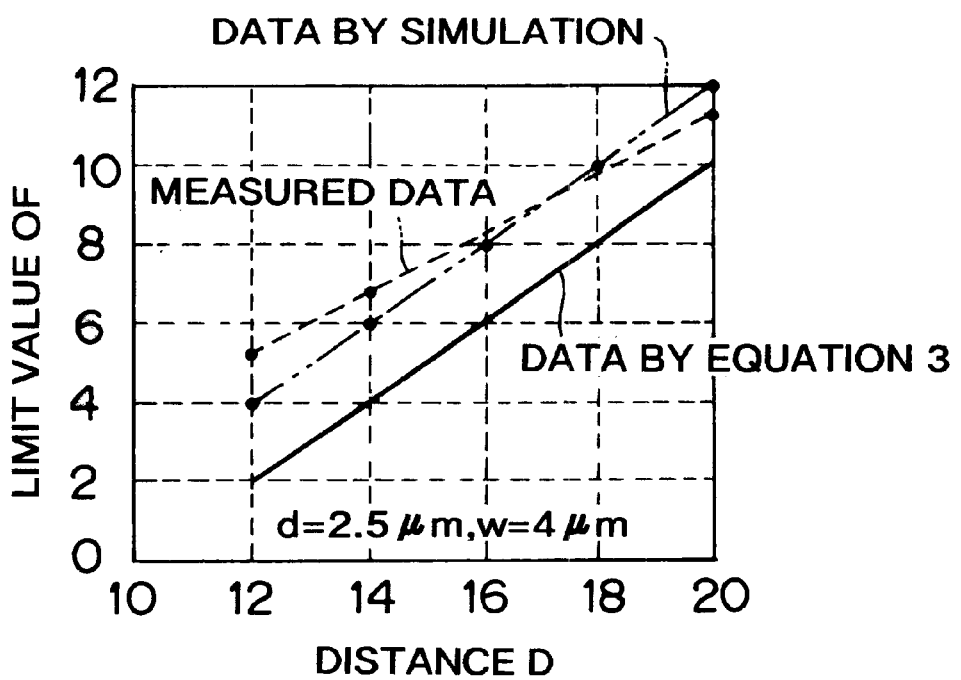
FIG. 6 is a graph indicating limit values of the maximum amount of displacement A determined while the distance d is varied.

The aforementioned points will be verified with reference to the graph of FIG. 6, which indicates limit values of the maximum amount of displacement A that were calculated and actually measured in the following manners. That is, the distance d and the width w were set to 2.5 μm and 4 μm, respectively, and limit values of the maximum amount of displacement A were calculated and were actually measured while the distance D was varied. In the graph, a solid line indicates limit values calculated in accordance with the condition of mathematical expression 3, and a two-dot chain line indicates limit values calculated based on a simulation taking into consideration the process of the movable electrode 200 being displaced toward the fixed electrode 100 up to the maximum amount of displacement A. Furthermore, a broken line in FIG. 6 indicates results of actual measurement through the use of an angular speed detecting device constructed as illustrated in FIG. 1. The graph indicates that despite variations of the distance D, the limit value of the maximum amount of displacement A provided by the simulation calculation and the actual measurement were always greater than the limit value of the maximum amount of displacement A provided by calculation of mathematical expression 3. Therefore, it can be understood that a satisfactory design can be obtained if the distances D, d, the maximum amount of displacement A and the width w satisfy the relationship of $D>A+(10dw)^{1/2}$ as mentioned above.

Next, various modifications of the fixed electrode 100 and the movable electrode 200 according to the embodiment will be sequentially described.

Figure 7:
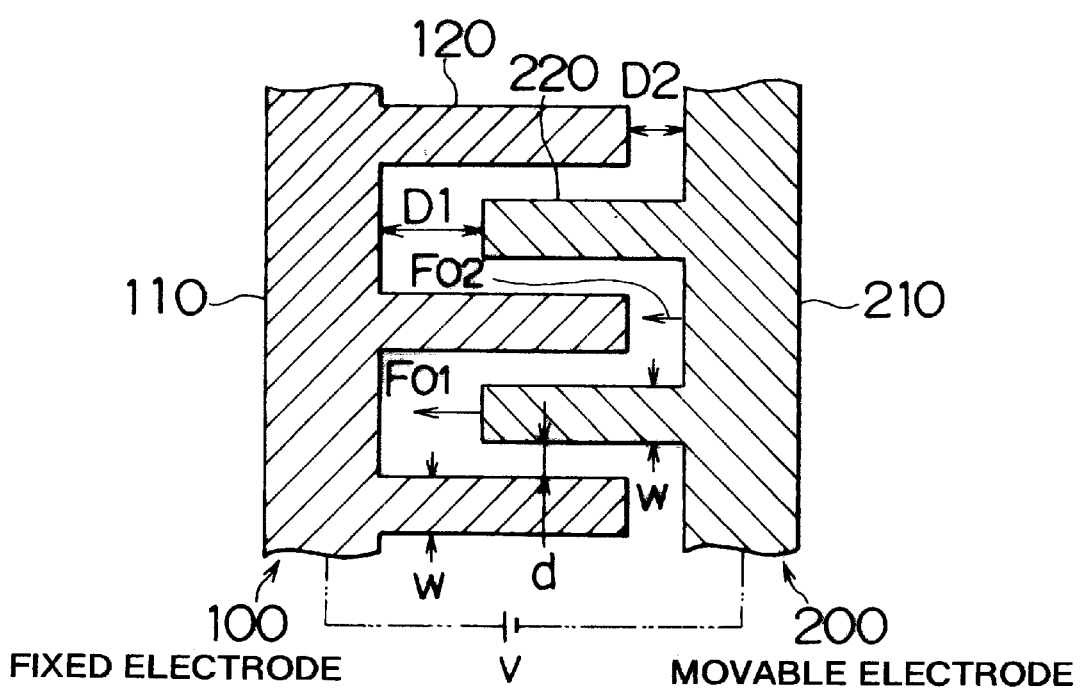
FIG. 7 is a plan view of comb-like electrodes according to a first modification.

A first modification will be described with reference to a drawing. As shown in FIG. 7, an angular speed detecting device according to this modification has a fixed electrode 100 and a movable electrode 200 similar to those of the foregoing embodiment. The length of electrode fingers 120 of the fixed electrode 100 is different from the length of electrode fingers 220 of the movable electrode 200. The distance from a distal end surface of each electrode finger 220 of the movable electrode 200 to an edge of a basal portion 110 of the fixed electrode 100 that is located between electrode fingers 120 and that faces the distal end surface of the electrode finger 220 is set to "D1". The distance from a distal end surface of each electrode finger 120 of the fixed electrode 100 to an edge of a basal portion 210 of the movable electrode 200 that is located between electrode fingers 220 and that faces the distal end surface of the electrode finger 120 is set to "D2". Other constructions are substantially the same as those of the foregoing embodiment.

Therefore, the attraction force $F_01$ acting between the distal end surfaces of the electrode fingers 220 of the movable electrode 200 and the basal portion 110 of the fixed electrode 100 facing the distal end surfaces of the electrode fingers 220 is expressed as in mathematical expression 4. The attraction force $F_02$ acting between the distal end surfaces of the electrode fingers 120 of the fixed electrode 100 and the basal portion 210 of the movable electrode 200 facing the distal end surfaces of the electrode fingers 120 is expressed as in mathematical expression 5.

$$F_0 1 = \epsilon T w V^2 / 2(D1-A)^2 \quad \text{[Mathematical Expression 4]}$$

$$F_0 2 = \epsilon T w V^2 / 2(D2-A)^2 \quad \text{[Mathematical Expression 5]}$$

Therefore, the attraction force $F_0$ obtained by summing the electrostatic attractions $F_01$ and $F_02$ is expressed as in mathematical expression 6.

$$F_0 = \epsilon T w V^2 / 2(D1-A)^2 + \epsilon T w V^2 / 2(D2-A)^2 \quad \text{[Mathematical Expression 6]}$$

As in the foregoing embodiment, it is desirable that $F>10F_0$ be satisfied. In this case, it is advisable that a relationship expressed by mathematical expression 7 be satisfied.

$$1/(5dw) > \{1/(D1-A)^2\} + \{1/(D2-A)^2\} \quad \text{[Mathematical Expression 7]}$$

Mathematical expression 7 becomes equivalent to mathematical expression 3 if the distances D1, D2 are changed to the distance D, that is, if the electrode fingers 120, 220 of the fixed electrode 100 and the movable electrode 200 have equal lengths as in the foregoing embodiment. That is, mathematical expression 7 is a generalized expression of mathematical expression 3, and therefore includes mathematical expression 3. In this case, too, as the distances D1, D2 are increased, or as the distance d and the width w are reduced, the effect of the attraction forces $F_01$, $F_02$ reduces, so that higher-precision measurement becomes possible. That is, if the fixed electrode 100 and the movable electrode 200 according to the first modification are used as driving-side electrodes, the movable electrode 200 can be displaced with good precision. If the fixed electrode 100 and the movable electrode 200 are used as detecting electrodes, the displacement of the electrode fingers 220 of the movable electrode 200 can be detected with good precision.

In this case, too, in designing the distances D1, D2, d, the maximum amount of displacement A, and the width w regarding the fixed electrode 100 and the movable electrode 200, it is advisable to first specify the distance d and the width w, considering the limits of the processing of the electrodes 100, 200. Subsequently, the maximum amount of displacement A may be determined, taking into consideration the sensitivity and the size of the fixed electrode 100 and the movable electrode 200. Finally, the distances D1, D2 may be determined.

Figure 8:
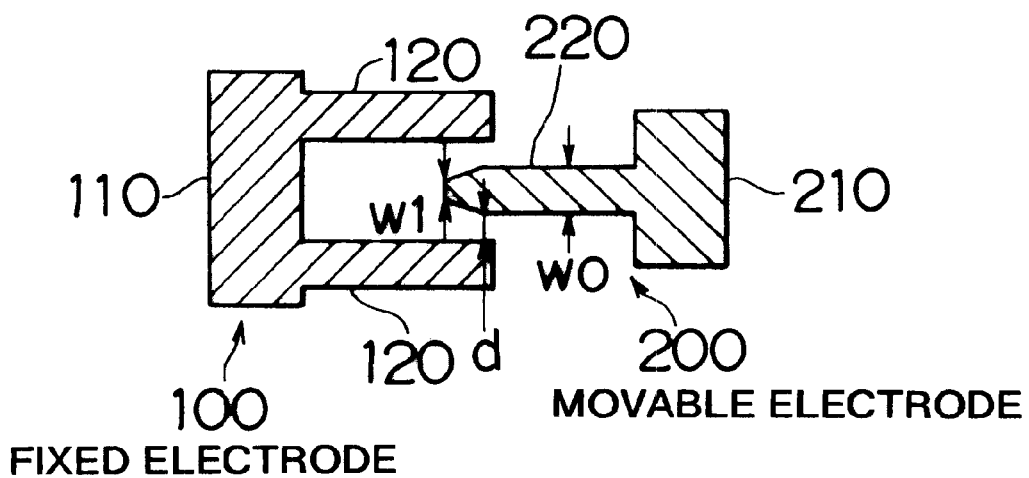
FIG. 8 is a plan view of an example of comb-like electrodes according to a second modification.

Next, a second modification will be described with reference to a drawing. As shown in FIG. 8, an angular speed detecting device according to this modification has a fixed electrode 100 and a movable electrode 200 similar to those of the foregoing embodiment. In this modification, opposite sides of a distal end portion of each of electrode fingers 220 of the movable electrode 200 are diagonally linearly cut so that the two-dimensional shape of the distal end portion becomes a trapezoidal shape. Therefore, the width w1 of the distal end of each electrode finger 220 is less than the width w0 of a portion of each electrode finger 220 adjacent to the basal portion 210.

Figure 9:
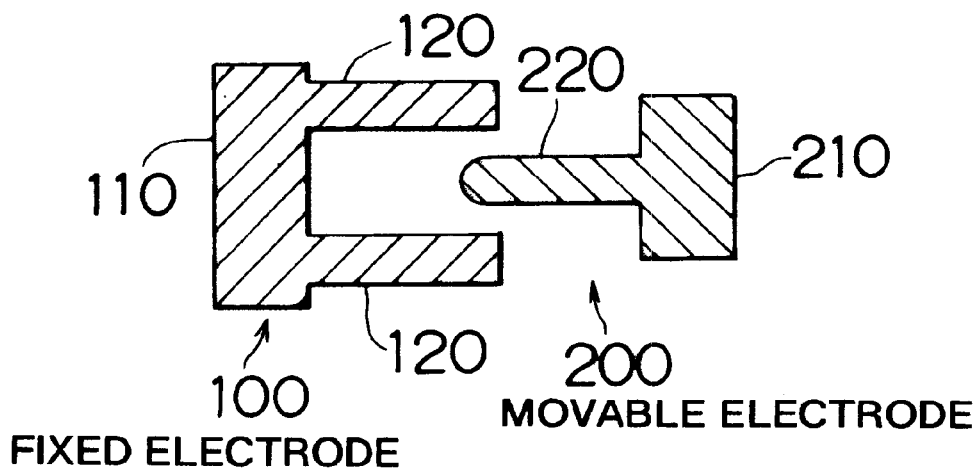
FIG. 9 is a plan view of comb-like electrodes according to the second modification differing in configuration from the comb-like electrodes shown in FIG. 8.

Therefore, the area of the distal end surface of each electrode finger 220 of the movable electrode 200 is substantially reduced. Hence, if the fixed electrode 100 and the movable electrode 200 according to the second modification are used as driving-side electrodes, the movable electrode 200 can be displaced with good precision. If the fixed electrode 100 and the movable electrode 200 are used as detecting electrodes, the displacement of the electrode fingers 220 of the movable electrode 200 can be detected with good precision. According to the second modification, the distal end of each electrode finger 220 of the movable electrode 200 may be pointed so that the two-dimensional shape of a distal end portion of each electrode finger 220 becomes a triangular shape. Furthermore, as shown in FIG. 9, the two-dimensional shape of a distal end portion of each electrode finger 220 may be a roundish shape. These modifications also reduce the area of the distal end surface of each electrode finger 220, thereby achieving substantially the same advantages as achieved by the second modification.

Furthermore, in the second modification, the attracting force of the fixed electrode 100 on the movable electrode 200 and the attracting force of the movable electrode 200 on the fixed electrode 100 have an action-reaction relationship. Therefore, instead of cutting the distal end portion of each electrode finger 220 of the movable electrode 200 as in the second modification, a distal end portion of each electrode finger 120 of the fixed electrode 100 may be cut into a trapezoidal shape, a triangular shape or a roundish shape in a plan view so that the distal end of each electrode finger 120 has a less width than a portion of each electrode finger 120 adjacent to the basal portion 110. Such modifications provide substantially the same results as provided by the second modification. Still further, a distal end portion of each of the electrode fingers 120, 220 of the fixed electrode 100 and the movable electrode 200 may be cut into a trapezoidal shape, a triangular shape or a roundish shape in a plan view so that the distal end of each of the electrode fingers 120, 220 has a less width than a portion of each electrode finger adjacent to the base portion 110 or 210.

Figure 10:
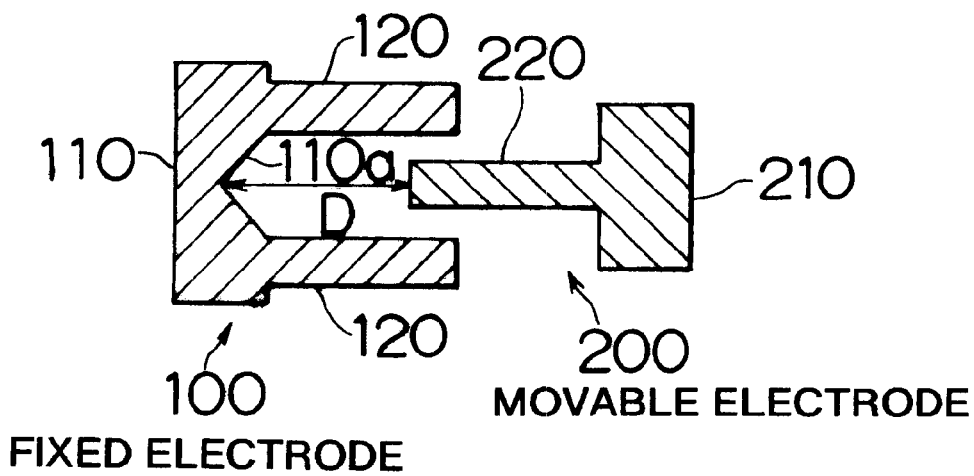
FIG. 10 is a plan view of comb-like electrodes according to a third modification.

Next, a third modification will be described with reference to a drawing. As shown in FIG. 10, an angular speed detecting device according to this modification has a fixed electrode 100 and a movable electrode 200 similar to those of the foregoing embodiment. In this modification, each edge surface of the basal portion 110 of the fixed electrode 100 that is located between electrode fingers 120 and that faces a distal end surface of a corresponding one of electrode fingers 220 of the movable electrode 200 has a cutout 110a. Each cutout 110a has a triangular shape in a plan view such that the cutout width decreases with increases in the distance from the distal end of the corresponding one of the electrode fingers 220 of the movable electrode 200.

Figure 11:
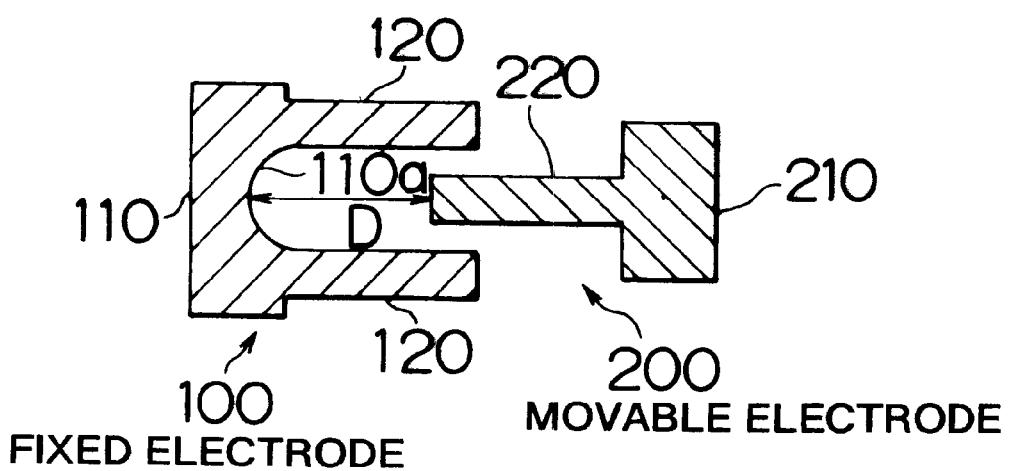
FIG. 11 is a plan view of comb-like electrodes according to the third modification differing in configuration from the comb-like electrodes shown in FIG. 10.

Therefore, the distance D from the distal end surface of each electrode finger 220 of the movable electrode 200 to the corresponding edge surface of the basal portion 110 between electrode fingers 120 of the fixed electrode 100 is substantially increased, so that the attraction force $F_0 = \epsilon TwV^2/(D-A)^2$ defined by mathematical expression 2 reduces. Therefore, if the fixed electrode 100 and the movable electrode 200 of the third modification are used as driving-side electrodes, the movable electrode 200 can be displaced with good precision. If the fixed electrode 100 and the movable electrode 200 are used as detecting electrodes, the displacement of the electrode finger 220 of the movable electrode 200 can be detected with good precision. According to the third modification, the two-dimensional shape of each cutout 110a may be a trapezoidal shape, or a roundish shape as shown in FIG. 11. Such modifications also substantially increase the distance D, and can achieve substantially the same advantages as achieved by the third modification.

In the third modification, too, the attracting force of the fixed electrode 100 on the movable electrode 200 and the attracting force of the movable electrode 200 on the fixed electrode 100 have an action-reaction relationship. Therefore, instead of forming cutouts in the basal portion 110 of the fixed electrode 100 as in the third modification, cutouts of a trapezoidal shape, a triangular shape, a roundish shape, etc. may be formed in edge surfaces of the basal portion 210 of the movable electrode 200 that are located between electrode fingers 220 and that face distal end surfaces of corresponding electrode fingers 120 of the fixed electrode 100, in such a manner that the width of each cutout decreases with increases in the distance from the distal end surface of the corresponding one of the electrode fingers 120 of the fixed electrode 100. This modification provides substantially the same results as described above. Furthermore, trapezoidal, triangular or roundish cutouts as described above may also be formed in edge surfaces of the basal portions 110, 210 between electrode fingers 120, 220 of the fixed electrode 100 and the movable electrode 200.

The arts according to the foregoing embodiment and the first to third modifications may be adopted either singly or in any combination. For example, a modification may be made as follows. That is, the distance D or the distances D1, D2 are set to great values or the distance d and the width w are set to small values such that the inequality of mathematical expression 3, $D > A + (10dw)^{1/2}$, in the embodiment, or the inequality of mathematical expression 7, $1/(5dw) > \{1/(D1-A)^2\} + \{1/(D2-A)^2\}$, in the first modification is approximately satisfied although it may not be perfectly satisfied. In addition, distal end portions of the electrode fingers 120 of the fixed electrode 100 and/or distal end portions of the electrode fingers 220 of the movable electrode 200 are reduced in width as in the second modification, or the basal portion 110 of the fixed electrode 100 and/or the basal portion 210 of the movable electrode 200 is provided with cutouts. Furthermore, it is also possible to adopt a construction in which a distal end portion of each electrode finger 120 of the fixed electrode 100 and/or a distal end portion of each electrode finger 220 of the movable electrode 200 is reduced in width, and the basal portion 110 of the fixed electrode 100 and/or the basal portion 210 of the movable electrode 200 is provided with cutouts.

Although in the foregoing description of the embodiment, the fixed electrode 100 and the movable electrode 200 according to the invention are described in conjunction with the application to the driving electrodes 51-1 to 51-4 and the drive monitor electrodes 52-1 to 52-4, the fixed electrode 100 and the movable electrode 200 may also be applied to the detecting electrodes 53-1 to 53-4 for detecting the displacement of the vibrator 20 based on Coriolis force. In this case, a satisfactory result can be provided by arranging comb-like electrodes 53$a$1 to 53$a$4, 21$a$1 to 21$a$4, and 22$a$1 to 22$a$4 of detecting electrodes 53-1 to 53-4 so that the electrode fingers thereof extend in the directions of the Y-axis, and by setting the directions of vibration of the vibrator 20 caused by Coriolis force to the directions of the axis of each electrode finger of the comb-like electrodes 53$a$1 to 53$a$4, 21$a$1 to 21$a$4, and 22$a$1 to 22$a$4. Furthermore, the fixed electrode 100 and the movable electrode 200 may also be applied to various other electrodes, such as correcting electrodes for correcting the displacement of the vibrator 20, adjusting electrodes for reducing disturbance displacement of the vibrator, etc.

Although in the foregoing embodiment is described in conjunction with the application of the invention to an angular speed detecting device, the invention is not limited thereto, but may also be applied to a physical quantity detecting device for detecting a physical quantity, such as acceleration, pressure, etc. In this case, a satisfactory result can be provided by a design in which comb-like electrodes are displaced in the directions of the axis of each electrode finger of the comb-like electrodes by a force related to the physical quantity, such as acceleration, pressure, etc, and such displacement is detected. In short, comb-like electrodes according to the invention are applicable to various physical quantity detecting devices as long as the detecting devices are devices that drive comb-like electrodes in the directions of the axis of each electrode finger or detect the displacement of comb-like electrodes in the directions of the axis while applying a voltage between the fixed electrode and the movable electrode.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A physical quantity detector apparatus that has a vibrator displaceably supported to a substrate and that detects a physical quantity in accordance with a displacement of the vibrator, the apparatus comprising:
   a comb-like fixed electrode fixed to the substrate and having a plurality of electrode fingers that extend from a basal portion of the fixed electrode in parallel to each other; and
   a comb-like movable electrode being displaceable together with the vibrator and having a plurality of electrode fingers that extend from a basal portion of the movable electrode in parallel to each other and that are inserted between the electrode fingers of the fixed electrode,
   wherein as a voltage is applied between the fixed electrode and the movable electrode, the movable electrode is displaced in a direction of an axis of each electrode finger, and
   wherein a distance D1 from a distal end surface of each electrode finger of the movable electrode to the basal portion of the fixed electrode facing the distal end surface of each electrode finger of the movable electrode, a distance D2 from a distal end surface of each electrode finger of the fixed electrode to the basal portion of the movable electrode facing the distal end surface of each electrode finger of the fixed electrode, a maximum displacement A of the movable electrode in the direction of the axis of each electrode finger, a width w of each electrode finger of the movable electrode and of each electrode finger of the fixed electrode, and a distance d between each electrode finger of the movable electrode and an adjacent electrode finger of the fixed electrode in a direction of the width satisfy a relationship of $1/(5dw) > \{1/(D1-A)^2\} + \{1/(D2-A)^2\}$ where a driving force electrode satisfies a relationship $F = \epsilon T V^2/d$ and a derogatory electrostatic attraction force of the movable electrode satisfies a relationship $F_0 = \epsilon T_w V^2/(D-A)^2$ so that the electrostatic attraction $F_0$ is ignorable if $F > 10 F_0$.

2. A physical quantity detector apparatus according to claim 1, wherein the comb-like fixed electrode and the comb-like movable electrode are used to vibrate the vibrator.

3. A physical quantity detector apparatus according to claim 1, wherein the comb-like fixed electrode and the comb-like movable electrode are used to detect a vibration of the vibrator.

4. A physical quantity detector apparatus according to claim 1, wherein if the distance D1 from the distal end surface of each electrode finger of the movable electrode to the basal portion of the fixed electrode facing the distal end surface of each electrode finger of the movable electrode and the distance D2 from the distal end surface of each electrode finger of the fixed electrode to the basal portion of the movable electrode facing the distal end surface of each electrode finger of the fixed electrode are made equal to each other, a relationship $D > A + (10dw)^{1/2}$ is satisfied, where D=D1=D2.

5. A method for designing a physical quantity detector apparatus as described in claim 1, the method comprising:
   setting the distance d and the width w to processing limits thereof;
   setting the maximum displacement A based on a size of the physical quantity detector apparatus and a sensitivity requirement of the apparatus; and
   determining the distance D1 and the distance D2 based on the relational expression of $1/(5dw) > [1/(D1-A)^2] + [1/(D2-A)^2]$.

6. A method for designing a physical quantity detector apparatus as described in claim 4, the method comprising:
   setting the distance d and the width w to processing limits thereof;
   setting the maximum displacement A based on a size of the physical quantity detector apparatus and a sensitivity requirement of the apparatus; and
   determining the distance D based on the relational expression of $D > A + (10dw)^{1/2}$, where D=D1=D2.

7. A physical quantity detector apparatus according to claim 1 that has a vibrator displaceably supported to a substrate and that detects a physical quantity in accordance with a displacement of the vibrator, the apparatus comprising:

a comb-like fixed electrode fixed to the substrate and having a plurality of electrode fingers that extend from a basal portion of the fixed electrode in parallel to each other; and a comb-like movable electrode being displaceable together with the vibrator and having a plurality of electrode fingers that extend from a basal portion of the movable electrode in parallel to each other and that are inserted between the electrode fingers of the fixed electrode, wherein as a voltage is applied between the fixed electrode and the movable electrode, the movable electrode is displaced in a direction of an axis of each electrode finger, and wherein each electrode finger of at least one of the movable electrode and the fixed electrode is formed so that a distal end portion of each electrode finger is narrower in width than a basal portion-side portion of the electrode finger.

8. A physical quantity detector apparatus according to claim 7, wherein the comb-like fixed electrode and the comb-like movable electrode are used to vibrate the vibrator.

9. A physical quantity detector apparatus according to claim 7, wherein the comb-like fixed electrode and the comb-like movable electrode are used to detect a vibration of the vibrator.

10. A physical quantity detector apparatus according to claim 7, wherein the distal end portion of each electrode finger that is narrowed has a trapezoidal shape in a plan view.

11. A physical quantity detector apparatus according to claim 7, wherein the distal end portion of each electrode finger that is narrowed has a triangular shape in a plan view.

12. A physical quantity detector apparatus according to claim 7, wherein the distal end portion of each electrode finger that is narrowed has an arcuate shape in a plan view.

13. A physical quantity detector apparatus according to claim 1 that has a vibrator displaceably supported to a substrate and that detects a physical quantity in accordance with a displacement of the vibrator, the apparatus comprising:

a comb-like fixed electrode fixed to the substrate and having a plurality of electrode fingers that extend from a basal portion of the fixed electrode in parallel to each other; and a comb-like movable electrode being displaceable together with the vibrator and having a plurality of electrode fingers that extend from a basal portion of the movable electrode in parallel to each other and that are inserted between the electrode fingers of the fixed electrode, wherein as a voltage is applied between the fixed electrode and the movable electrode, the movable electrode is displaced in a direction of an axis of each electrode finger, and wherein cutouts are formed in at least one of a group of basal portion surfaces that are located between electrode fingers of the fixed electrode and that face distal end surfaces of corresponding electrode fingers of the movable electrode and a group of basal surfaces that are located between electrode fingers of the movable electrode and that face distal end surfaces of corresponding electrode fingers of the fixed electrode, and each cutout becomes narrower with increases in distance from the distal end surface of a corresponding electrode finger.

14. A physical quantity detector apparatus according to claim 13, wherein the comb-like fixed electrode and the comb-like movable electrode are used to vibrate the vibrator.

15. A physical quantity detector apparatus according to claim 13, wherein the comb-like fixed electrode and the comb-like movable electrode are used to detect a vibration of the vibrator.

16. A physical quantity detector apparatus according to claim 13, wherein the cutouts formed in the basal portion surfaces between the electrode fingers have a trapezoidal shape in a plan view.

17. A physical quantity detector apparatus according to claim 13, wherein the cutouts formed in the basal portion surfaces between the electrode fingers have a triangular shape in a plan view.

18. A physical quantity detector apparatus according to claim 13, wherein the cutouts formed in the basal portion surfaces between the electrode fingers have an arcuate shape in a plan view.

* * * * *